United States Patent
Nakano et al.

(10) Patent No.: US 12,196,143 B2
(45) Date of Patent: Jan. 14, 2025

(54) ORGANIZING SENSORS DATA AND TRANSMISSION ORDER

(71) Applicant: Hitachi Astemo, Ltd., Hitachinaka (JP)

(72) Inventors: Hiroshi Nakano, Tokyo (JP);
Nobuyasu Kanekawa, Tokyo (JP);
Atsushi Arata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 129 days.

(21) Appl. No.: 17/922,814

(22) PCT Filed: Feb. 2, 2021

(86) PCT No.: PCT/JP2021/003647
§ 371 (c)(1),
(2) Date: Nov. 2, 2022

(87) PCT Pub. No.: WO2021/229863
PCT Pub. Date: Nov. 18, 2021

(65) Prior Publication Data
US 2023/0160351 A1    May 25, 2023

(30) Foreign Application Priority Data
May 11, 2020   (JP) .................. 2020-083451

(51) Int. Cl.
*G06F 7/02*       (2006.01)
*F02D 41/00*     (2006.01)
*F02D 41/22*     (2006.01)

(52) U.S. Cl.
CPC ......... *F02D 41/009* (2013.01); *F02D 41/222* (2013.01)

(58) Field of Classification Search
CPC ..... H04L 2012/40273; H04L 12/40169; H04L 69/08; F02D 41/009; F02D 41/222
See application file for complete search history.

(56) References Cited

U.S. PATENT DOCUMENTS

| | | | | |
|---|---|---|---|---|
| 5,369,581 | A * | 11/1994 | Ohsuga | B60W 10/11 280/5.513 |
| 6,343,249 | B1 * | 1/2002 | Sakai | H04L 12/66 709/201 |
| 7,912,600 | B2 * | 3/2011 | Iwagami | G05B 19/0421 701/32.8 |

FOREIGN PATENT DOCUMENTS

| | | |
|---|---|---|
| JP | 5-298213 A | 11/1993 |
| JP | 2000-310153 A | 11/2000 |
| JP | 2001-251327 A | 9/2001 |
| JP | 2010-268066 A | 11/2010 |

(Continued)

OTHER PUBLICATIONS

Chinese-language Office Action issued in Chinese Application No. 202180032335.X dated Jun. 16, 2023 with English translation (15 pages).

(Continued)

*Primary Examiner* — Gonzalo Laguarda
(74) *Attorney, Agent, or Firm* — Crowell & Moring LLP

(57) ABSTRACT

A vehicle controller includes a plurality of detectors, a control unit, a data collecting unit, a serial communication line, and a transmission order setting unit. Data that changes at a speed that is lower than a given speed value is transmitted in a period in which a communication volume is lower than a given communication volume value. The transmission order is an order in which the pieces of detection data are serially transmitted from the data collecting unit to the control unit.

11 Claims, 7 Drawing Sheets

(56) References Cited

FOREIGN PATENT DOCUMENTS

| | | |
|---|---|---|
| JP | 2013-181418 A | 9/2013 |
| JP | 2014-25405 A | 2/2014 |
| JP | 2014-78816 A | 5/2014 |
| JP | 2014-95292 A | 5/2014 |
| JP | 2017-84247 A | 5/2017 |
| WO | WO 2019/155700 A1 | 8/2019 |

OTHER PUBLICATIONS

International Search Report (PCT/ISA/210) issued in PCT Application No. PCT/JP2021/003647 dated May 11, 2021 with English translation (six (6) pages).

Japanese-language Written Opinion (PCT/ISA/237) issued in PCT Application No. PCT/JP2021/003647 dated May 11, 2021 (five (5) pages).

Japanese-language Office Action issued in Japanese Application No. 2020-083451 dated Jul. 11, 2023 with English translation (10 pages).

\* cited by examiner

FIG. 3
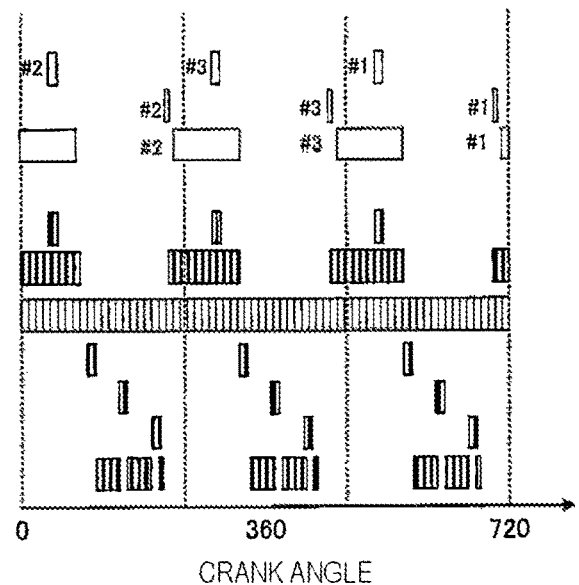
FIG. 4A ROTATION AT LOW SPEED
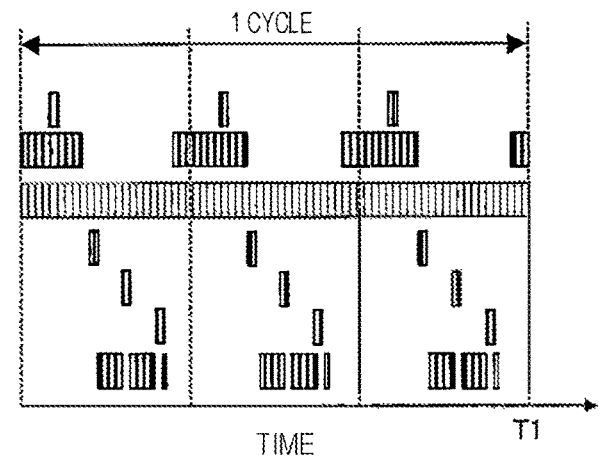
FIG. 4B ROTATION AT HIGH SPEED
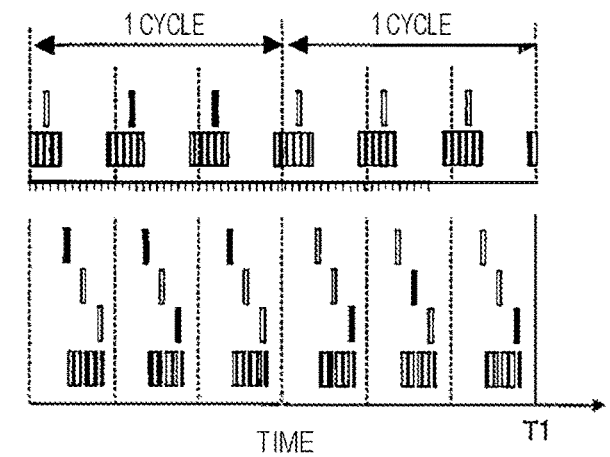

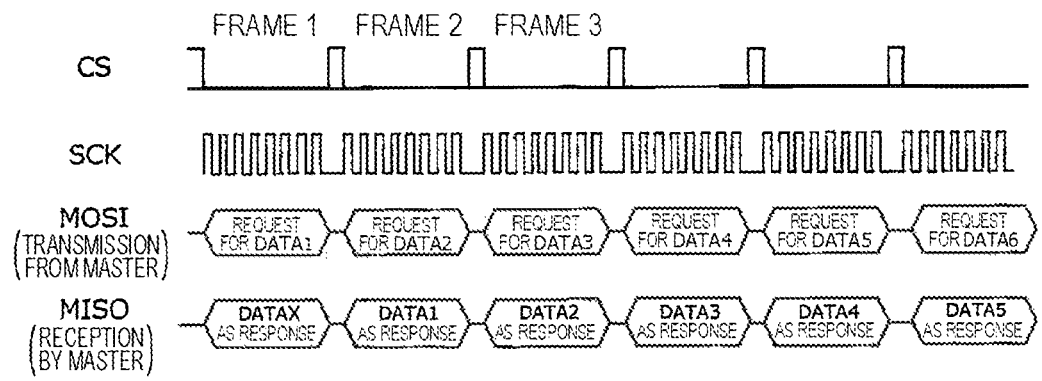

TRANSMISSION FRAME FROM MASTER (MOSI)

| R.ADR1 8bit | T.ADR 8bit | T.DATA 16bit |
|---|---|---|

RECEPTION FRAME TO MASTER (MISO)

| R.ADR2 8bit | R.DATA 16bit | DIAG 8bit |
|---|---|---|

ORGANIZING SENSORS DATA AND TRANSMISSION ORDER

TECHNICAL FIELD

The present invention relates to a vehicle controller.

BACKGROUND ART

In recent years, development of a driver assist function and an autonomous driving function with higher performances has been in progress to improve the safety and comfortability of automobiles. Along with this trend, the higher efficiency of internal combustion engines and motors, which generate power for vehicles, is in demand, too. To meet these requirements, the numbers and types of sensors and actuators has been increasing.

As a result, the number of harnesses for connecting sensors and actuators increases, too, which poses problems of a decrease in space in vehicles and an increase in the weight of vehicles and in manufacturing manhour.

To transmit a number of sensor signals using fewer harnesses, serial transmission is adopted as an effective means. Because serial transmission is a transmission method by which a number of pieces of sensor data are transmitted in sequence using one transmission path, the order of priority of data to be transmitted needs to be set according to a transmission rate required for each sensor data.

A technique of such in-vehicle serial transmission is disclosed in PTL 1.

The technique described in PTL 1 includes a determination function by which, when a plurality of requests for transmission of sensor data overlap in serial transmission, sensor data with a high priority level among pieces of sensor data overlapping in transmission request is selected and transmitted.

By this function, even when pieces of sensor data to be transmitted overlap, the influence of a delay in sensor data transmission on control can be reduced.

CITATION LIST

Patent Literature

PTL 1: JP 2014-95292 A

SUMMARY OF INVENTION

Technical Problem

The technique disclosed in PTL 1 is effective in a case where the number of sensors and the volume of data are relatively small and the sufficiently high transmission rate of a transmission path is ensured.

However, when a large volume of sensor data is transmitted from a number of sensors at a transmission rate, the number of times of determining priority levels increases, in which case a transmission delay, such as an extensive delay in transmission of sensor data with a low priority level, is likely to happen.

In addition, a delay time of transmission data changes, which causes data processing depending on delay times, such as low-pass filter processing, some trouble.

The present invention has been conceived to solve the above problems, and an object of the present invention is to provide a vehicle controller that in serial communication executed at a limited transmission rate, can efficiently transmit a large volume of sensor data and stably execute data processing and control.

Solution to Problem

In order to achieve the above object, the present invention is configured as follows.

A vehicle controller includes: a plurality of detectors that detect a plurality of operation conditions of a power generator; a control unit that controls the power generator, based on pieces of detection data outputted from the plurality of detectors; a data collecting unit that collects the pieces of detection data together; a serial communication line for serially transmitting the pieces of detection data from the data collecting unit to the control unit; and a transmission order setting unit that sets a transmission order of the pieces of detection data in advance, the transmission order being an order in which the pieces of detection data are serially transmitted from the data collecting unit to the control unit.

Advantageous Effects of Invention

A vehicle controller that in serial communication executed at a limited transmission rate, can efficiently transmit a large volume of sensor data and stably execute data processing and control is provided.

BRIEF DESCRIPTION OF DRAWINGS

FIG. 3 depicts operation conditions of an engine and sensor data that are transmitted in accordance with operation conditions of the engine, according to the first embodiment of the present invention.

FIGS. 4A and 4B depict a fact that in the first embodiment of the present invention, a time required for executing one cycle of a scheduling table differs between a case where the engine operates at a low rotating speed and a case where the engine operates at a high rotating speed.

FIG. 5 is a timing chart of a communication method according to the first embodiment of the present invention.

FIG. 6 depicts an example of a data frame transmitted from a master and a reception frame received by the master, according to the first embodiment of the present invention.

DESCRIPTION OF EMBODIMENTS

Embodiments of the present invention will hereinafter be described with reference to the drawings.

EMBODIMENTS

First Embodiment

An example will be described, in which a first embodiment of the present invention is applied to a control system for an engine incorporated in a vehicle.

Figure 1:
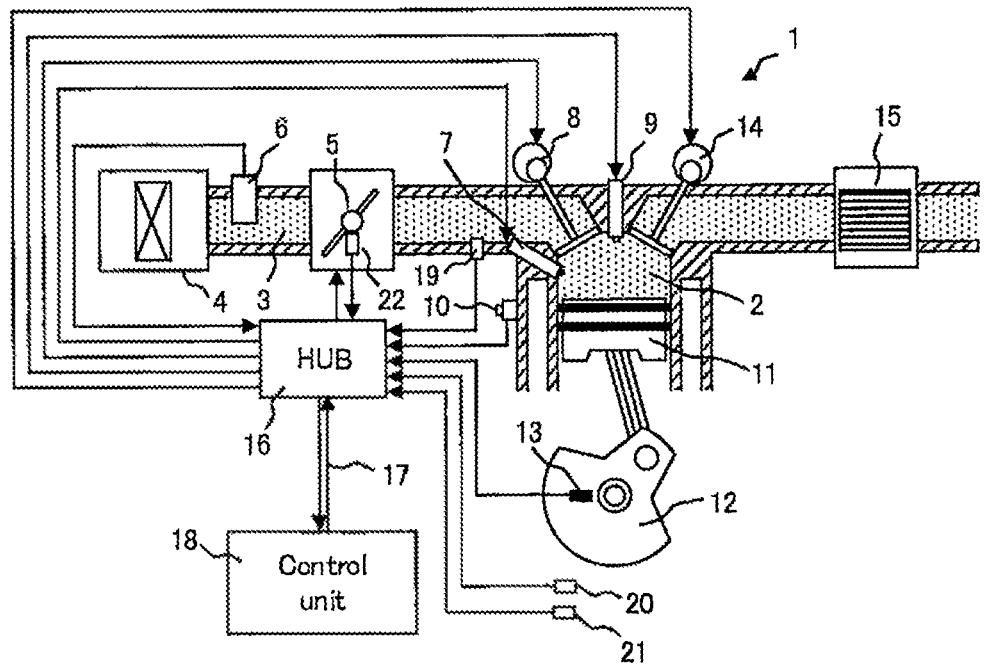
FIG. 1 is a schematic configuration diagram of an engine control system to which a first embodiment of the present invention is applied.

FIG. 1 is a schematic configuration diagram of an engine control system to which the first embodiment of the present invention is applied.

In FIG. 1, an engine 1 includes an air intake passage 3 through which atmospheric air is taken in. The air intake passage 3 includes an air cleaner 4 that filters foreign substances in the atmospheric air, an air flow rate meter 6 that measures the amount of taken-in air, a throttle valve 5 that adjusts the amount of taken-in air, a throttle position sensor 22, and an air intake temperature sensor 19 that measures the temperature of taken-in air. Taken-in air is sent into a combustion chamber 2 by opening/closing operations of an air intake valve 8.

The combustion chamber 2 is provided with a fuel injection valve 7 and with an ignition plug 9 that ignites a fuel-air mixture. On an outer wall of the combustion chamber 2, a knocking sensor 10 is disposed, which detects abnormal combustion. A piston 11 and a crankshaft 12 are provided as components that convert pressure created by combustion, into rotation. The crankshaft 12 is fitted with a crank angle sensor 13 that measures a rotation angle.

Following a combustion cycle, an exhaust gas is discharged to an exhaust passage by opening/closing of an exhaust valve 14. The exhaust passage is provided with a catalyst 15 for purifying the exhaust gas. The engine 1 is fitted also with a water temperature sensor 20 that measures the temperature of cooling water for the engine 1 and with an oil temperature sensor 21 that measures the temperature of lubricating oil. Locations of placement of these sensors are, however, not shown in FIG. 1.

A control system for the engine 1 will be described.

The engine 1 according to the first embodiment includes sensor-type components that measure engine conditions, such as the air flow rate meter 6, the throttle position sensor 22, the knocking sensor 10, the air intake temperature sensor 19, the crank angle sensor 13, the water temperature sensor 20, and the oil temperature sensor 21.

The engine 1 includes also actuator-type components that are physically driven to adjust an operation condition of the engine 1, such as the throttle valve 5, the fuel injection valve 7, the air intake valve 8, and the exhaust valve 14.

Signal lines for transmitting sensor data obtained by sensor-type components are connected to the hub unit 16, which serves as a data collecting unit. The sensor data is, therefore, collected together at the hub unit 16. The sensor data collected at the hub unit 16 is transmitted to a control unit 18 via a serial communication line 17 for serially transmitting the sensor data. Based on the sensor data, the control unit 18 calculates optimum operation parameters for an actuator-type component, and the calculated operation parameters are transmitted to the hub unit 16 via the serial communication line 17. Based on the received operating parameters, the hub unit 16 drives an actuator or transmits a drive signal.

Figure 2:
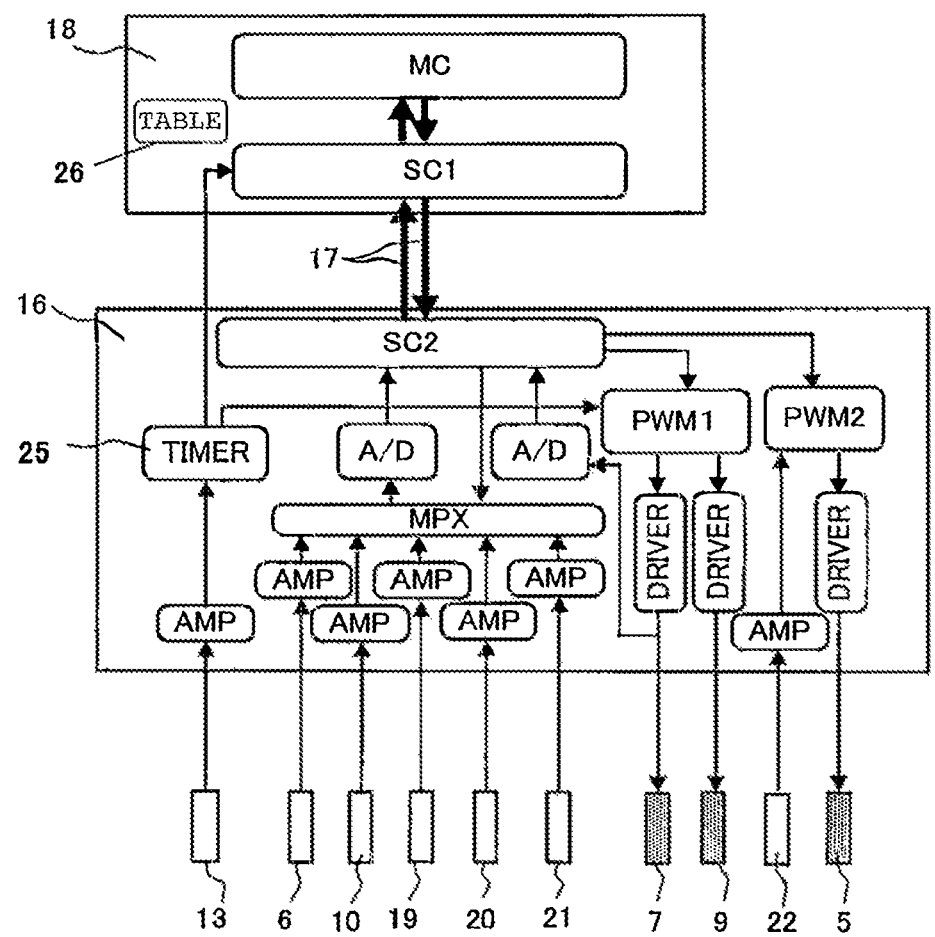
FIG. 2 depicts a configuration of a hub unit and a control unit according to the first embodiment of the present invention.

FIG. 2 depicts a configuration of the hub unit 16 and the control unit 18 according to the first embodiment of the present invention.

In FIG. 2, the sensor-type components (the air flow rate meter 6, the knocking sensor 10, the crank angle sensor 13, the air intake temperature sensor 19, the water temperature sensor 20, the oil temperature sensor 21) are connected to the hub unit 16, the sensor-type components being a plurality of detectors that detect a plurality of operation conditions of the engine 1 (power generator). These sensor-type components are connected to amplifiers AMP included in the hub unit 16. Analog signals, which are pieces of detection data obtained and outputted by the sensor-type components, are amplified by the amplifiers AMP.

The signals from the air flow rate meter 6, the knocking sensor 10, the air intake temperature sensor 19, the water temperature sensor 20, and the oil temperature sensor 21, the signals being amplified by the amplifiers AMP, are converted into digital values by a multiplexer MPX and analog/digital converters A/D. The multiplexer MPX switches an input channel for analog/digital conversion in accordance with an instruction from a second serial communication unit SC2. The sensor data having been converted into digital values (data given by converting the signals from the air flow rate meter 6, the knocking sensor 10, the air intake temperature sensor 19, the water temperature sensor 20, and the oil temperature sensor 21 into digital values) are transmitted to the second serial communication unit SC2.

The sensor data collected at the second serial communication unit SC2 are transmitted from the second serial communication unit SC2 to a first serial communication unit SC1 via the serial communication line 17, the first serial communication unit SC1 being included in the control unit 18, which is a control unit that controls the engine 1 serving as a power generator. The control unit 18 includes an arithmetic unit MC, which calculates operation parameters for the actuator-type components, from the sensor data received by the first serial communication unit SC1.

The calculated operation parameters are transmitted from the arithmetic unit MC to the first serial communication unit SC1 and then are transmitted to the second serial communication unit SC2 of the hub unit 16 via the serial communication line 17. The second serial communication unit SC2 determines types of the received operation parameters, and transmits the operation parameters to drivers DRIVER, which are drivers for the actuator-type components (the fuel injection valve 7, the ignition plug 9, the throttle valve 5), or to a pulse generator PWM1 and a pulse generator PWM2 that generate signals to the drivers DRIVER, from the operation parameters.

The pulse generator PWM1 generates a PWM waveform indicating an injection timing and an injection amount of the fuel injection valve 7. In this PWM waveform, a frequency and a phase, which indicate the injection timing, are generated based on a crank angle measured by the crank angle sensor 13 and on an operation parameter of the ignition timing calculated by the control unit 18. A pulse width indicating an injection amount is set based on the operation parameter calculated by the control unit 18.

The pulse generator PWM1 generates also a pulse wave for actuating the ignition plug 9. In this pulse wave, a frequency and a phase that indicate ignition timing are generated based on a crank angle measured by the crank angle sensor 13 and on an operation parameter of the ignition timing calculated by the control unit 18.

The pulse generator PWM2 generates a PWM waveform for driving the throttle valve 5. A degree of opening of the throttle valve 5 is determined by the duty ratio of the PWM waveform. The duty ratio is an operation parameter calculated by the arithmetic unit MC of the control unit 18. To achieve a target degree of opening of the throttle valve 5, the pulse generator PWM2 generates and outputs the PWM wave, based on a signal from the throttle position sensor 22, the signal being inputted to the pulse generator PWM2 via the amplifier AMP.

The crank angle sensor 13 detects the rotation of the crankshaft 12 and generates a pulse signal with a frequency corresponding to a rotating speed. The pulse signal from the crank angle sensor 13 is amplified by the amplifier AMP. The pulse signal amplified by the amplifier AMP is inputted to a timer 25, which counts pulses and outputs the number of pulses, i.e., a count value. This count value indicates a crank angle of the engine 1, and based on this crank angle, whether the combustion chamber 2 is in an air intake cycle, in a compression cycle, in an expansion cycle, or in an exhaust cycle can be determined. Crank angle data is transmitted to the first serial communication unit SC1 included in the control unit 18.

As shown in FIG. 2, the hub unit 16 acquires not only the sensor data from the sensor-type components but also operation signals for the actuator-type components, as sensor data, and transmits the sensor data to the control unit 18 via the serial communication line 17.

The first embodiment shows a process in which an operating voltage and an operating current value, which are outputted from the driver for the fuel injection valve 7, are converted into digital values by the A/D converter, and are transmitted to the second serial communication unit SC2.

As in the above configuration, when the sensor data from the sensor-type components and the operation parameters for the actuator-type components are transmitted (communicated) through the serial communication line 17, such a large volume of sensor data need to be transmitted (communicated) in a real-time manner.

In a case where a communication system with a transmission rate (communication speed) high enough to handle a volume of data detected is adopted, all pieces of sensor data may be transmitted in sequence. In this case, however, using an expensive communication system is prerequisite.

In serial communication using a limited transmission rate, sensor data needs to be transmitted efficiently in order to execute stable data processing and control.

A transmission scheduling function configured to achieve the above-mentioned efficient transmission of sensor data will hereinafter be described.

FIG. 3 shows an example in which the first embodiment of the present invention is applied to a controller for a three-cylinder engine serving as a power generator. FIG. 3 depicts operation conditions of the engine 1 and sensor data that are transmitted in accordance with operation conditions of the engine 1. The sensor data to be transmitted is determined by the operation conditions of the engine 1, that is, the cycles of fuel injection, ignition, and combustion. Because the cycles of the engine 1 are correlated with crank angles measured by the crank angle sensor 13 of the engine 1, an order in which pieces of sensor data are transmitted is set based on the crank angles (set with reference to the crank angles).

A transmission schedule shown in FIG. 3 will be described. In the example shown in FIG. 3, fuel injection, ignition, and combustion are performed in order at a cylinder 2, a cylinder 3, and a cylinder 1, respectively.

First, a fuel is injected by the fuel injection valve 7. At this time, to detect variations in timing of opening and closing of the fuel injection valve 7, a drive voltage and a drive current of the fuel injection valve 7 are serially transmitted to the control unit 18 through the serial communication line 17. The drive voltage and the drive current are transmitted only at a point of time of the fuel injection valve 7 being driven, and are not transmitted in a different period.

In other words, sensor data is serially transmitted only in the period during which sensor data needed for control is obtained. Transmitting data not needed for control, therefore, is unnecessary, in which case the volume of sensor data transmitted through serial communication can be reduced.

Subsequently, a fuel-air mixture is ignited by the ignition plug 9 to start combustion. At this time, to detect abnormal combustion, sensor data obtained by the knocking sensor 10 is transmitted to the control unit 18 via the serial communication line 17. This sensor data from the knocking sensor 10 is transmitted in the period of combustion cycle. The sensor data is not transmitted in other periods, such as the air intake cycle in which knocking does not occur.

Because the sensor data is serially transmitted only in a period during which knocking may occur, transmitting unnecessary data is avoided. This reduces the volume of sensor data transmitted through the serial communication line 17.

Sensor data from the air flow rate meter 6, however, needs to be constantly transmitted without depending on the combustion cycles of the engine 1 because sensor data that follows air intake pulsations is needed constantly. This sensor data, therefore, is constantly transmitted through serial communication without depending on a crank angle indicating an operation condition of the engine 1.

Data from the air intake temperature sensor 19, the water temperature sensor 20, and the oil temperature sensor 21 are data independent of the combustion cycles of the engine 1. Measurements by these temperature sensors (the air intake temperature sensor 19, the water temperature sensor 20, and the oil temperature sensor 21) gradually change in several seconds to several 10 seconds, depending on the temperature of the engine 1. Sensor data from the temperature sensors thus change at low speed.

It is therefore OK to transmit such sensor data changing at low speed in an idle time in the operation cycles of the engine 1, in which idle time fewer sensor data are transmitted.

In other words, such sensor data is transmitted in a period that does not overlap periods in which a drive voltage and a drive current of the fuel injection valve 7 and sensor data from the knocking sensor 10 are transmitted. In this period, other sensor data that change at low speed are transmitted as well.

As described above, based on a crank angle indicating an operation condition of the engine 1, sensor data is transmitted only in the period in which the data is needed for control, instead of all sensor data being transmitted constantly.

In addition, sensor data can be efficiently transmitted by serially transmitting the sensor data, based on a scheduling table 26 (a transmission order setting unit included in the control unit 18) which determines the order of data transmission in advance such that sensor data changing at low speed is transmitted in a period in which a communication volume is relatively small. The scheduling table 26 is the transmission order setting unit that sets in advance a transmission order in which sensor data are serially transmitted from the hub unit 16, which is the data collecting unit that collects pieces of detection data, to the control unit 18, which is the control unit.

FIG. 4 depicts a fact that in the first embodiment of the present invention, a time required for executing one cycle of the scheduling table 26 differs between a case where the engine 1 operates at a low rotating speed and a case where the engine 1 operates at a high rotating speed. As described above, sensor data transmitted via the serial communication line 17 is determined based on a crank angle of the engine 1. Accordingly, as shown in FIG. 4, observing sensor data transmission along the time axis reveals that the time required for executing one cycle of the scheduling table 26 differs between the case where the engine 1 operates at a low rotating speed and the case where the engine 1 operates at a high rotating speed.

Specifically, it is a characteristic fact that when sensor data are serially transmitted according to the scheduling table 26 that determines the order of transmission of sensor data in advance, based on crank angles indicating operation conditions of the engine 1 serving as the power generator, a volume of data transmitted through serial communication changes in accordance with an operation speed of the engine 1.

As described above, by transmitting the sensor data through the serial communication line 17 in the order set in advance (transmitting (communicating) the sensor data in the order set based on operation conditions of the engine 1 serving as the power generator), transmission requests for pieces of sensor data do not collide with each other. As a result, delay times of the sensor data are fixed, which allows data processing, such as low-pass filter processing depending on sampling periods of the sensor data, to be executed without any problem.

An example of a specific method of the serial communication described in the first embodiment will then be described.

In the first embodiment, an example in which serial peripheral interface (SPI) communication, which is full-duplex communication, is adopted as a serial communication method will be described.

FIG. 5 is a timing chart of a communication method according to the first embodiment. According to this method, the first serial communication unit SC1 included in the control unit 18 serves as a master in SPI communication, and the second serial communication unit SC2 included in the hub unit 16 serves as a slave in SPI communication. In SPI communication, data is transmitted/received, using four communication lines (CS, SCK, MOSI, MISO).

First, a slave to communicate with is selected, according to a change in the logical level of a CS signal. In the first embodiment, communication between the control unit 18 and the hub unit 16 is one-to-one communication, and therefore a single CS line is used for the communication. The SCK line carries a clock signal, the MOSI line carries transmission data from the master, and the MISO line carries reception data from the slave.

When the CS signal goes low in a frame 1, a clock signal is transmitted from the SCK line. At the same time, a signal requesting sensor data (DATA1) is transmitted from the MOSI line.

Subsequently, at a point of time at which the CS signal goes low in a frame 2, the slave transmits a sensor data value (DATA1) through the MISO line. Meanwhile, in the frame 2, the master then transmits a signal requesting sensor data (DATA2) through the MOSI line.

In a frame 3 to follow, the slave transmits a sensor data value (DATA2) through the MISO line. In this manner, the slave transmits sensor data requested by the master, to the master as a response thereto, and this process is repeated to exchange data between the master and the slave. The order and timing of transmission of sensor data requested by the master correspond to the order and timing set in a schedule based on rank angles.

FIG. 6 depicts an example of a data frame transmitted from the master and a reception frame received by the master.

The bit length of the transmission frame and that of the reception frame in the first embodiment are determined to be 32 bits.

The transmission frame is composed of an 8-bit reception address (R.ADR1), an 8-bit transmission address (T.ADR), and 16-bit transmission data (T.DATA). The reception address (R.ADR1) indicates which sensor's data is requested from the hub unit 16, and the transmission address (T.ADR) indicates to which actuator's operation parameter an operation parameter calculated by the control unit 18 corresponds. The transmission data (T.DATA) indicates the value of an operation parameter.

The reception frame is composed of an 8-bit reception address (R.ADR2) and 24-bit reception data (R.DATA). The reception address (R.ADR2) indicates to which sensor's data received data corresponds, and the reception data (R.DATA) indicates the value of sensor data.

As described above, the first embodiment of the present invention includes the scheduling function that determines the order of transmission of the sensor signals to be transmitted from the hub unit 16 to the control unit 18, and the scheduling function is configured to execute data transmission according to the scheduling table 26 that determines the order of transmission of the sensor data in advance, based on the operation conditions of the engine 1 serving as the power generator.

Specifically, based on a crank angle indicating an operation condition of the engine 1, sensor data is transmitted only in the period in which the data is needed for control, instead of all sensor data being transmitted constantly, and sensor data are serially transmitted based on the scheduling table 26 that determines the order of data transmission in advance such that sensor data changing at low speed is transmitted in a period in which a communication volume is relatively small. This allows efficient transmission of the sensor data.

A vehicle controller that in serial transmission executed at a limited transmission rate, can efficiently transmit a large volume of sensor data and stably execute data processing and control, therefore, can be provided.

In the first embodiment described above, the transmission frame and the reception frame do not include an error detection code. A CRC code or the like, however, may be included in these frames when necessary.

In the first embodiment, the configuration in which all the sensors and actuators are connected to the hub unit 16 has been described. It is, however, not always necessary to connect all the sensors and actuators to the hub unit 16. Setting the scheduling table 26 that determines the order of transmission of sensor data according to types of sensors or actuators connected to the hub unit 16 offers the same effects of the present invention as described above.

In the first embodiment, the configuration in which the hub unit 16 has the function of collecting signals from sensors and the function of driving actuators on the basis of operation parameters has been described. The configuration in which the hub unit 16 has only the function of collecting signals from sensors, however, offer the same effects of the present invention.

In the first embodiment, the scheduling table 26 is disposed in the control unit 18. The scheduling table 26, however, may be disposed in the hub unit 16.

Second Embodiment

A second embodiment of the present invention will then be described.

As the second embodiment of the present invention, a configuration in which the present invention is applied to the control system for the engine 1 will be described. In the second embodiment, the configuration in which the present invention is applied to the engine control system, as is in the first embodiment, will be described, with focus being placed on aspects of the second embodiment that are different from the first embodiment.

Figure 7:
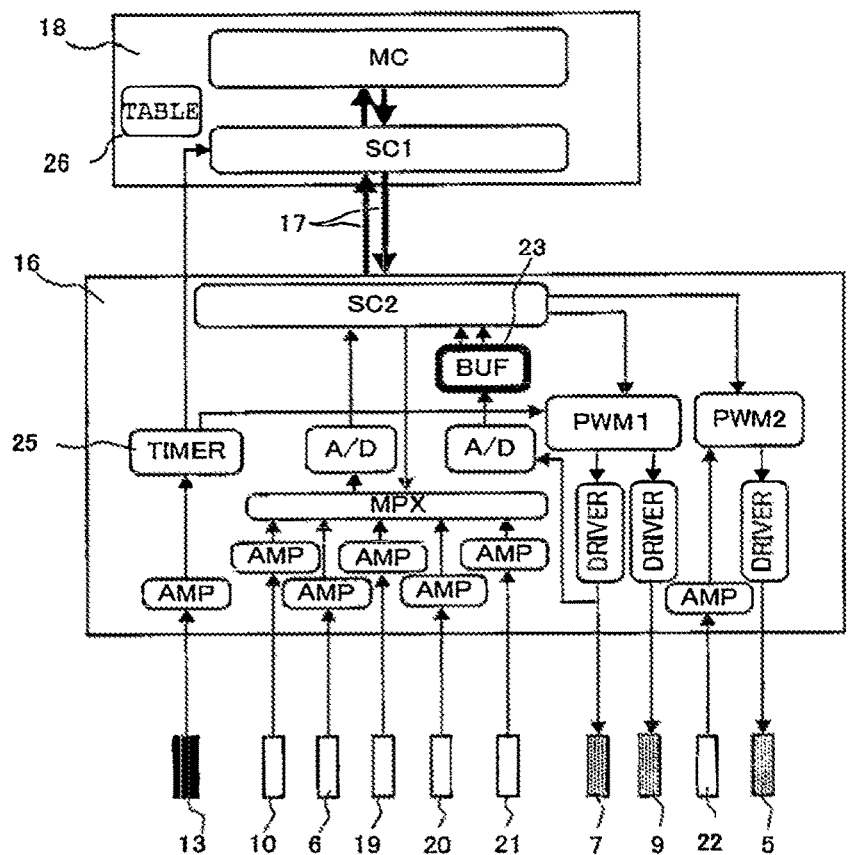
FIG. 7 depicts a configuration of a hub unit and a control unit according to a second embodiment of the present invention.

FIG. 7 depicts a configuration of the hub unit 16 and the control unit 18 according to the second embodiment.

The second embodiment is different from the first embodiment in that the hub unit 16 includes a buffer memory 23. As described in the first embodiment, an operating voltage and an operating current of the fuel injection valve 7 are converted into digital values by the A/D converter. The digital values, i.e., converted data are stored in the buffer memory 23.

Figure 8:
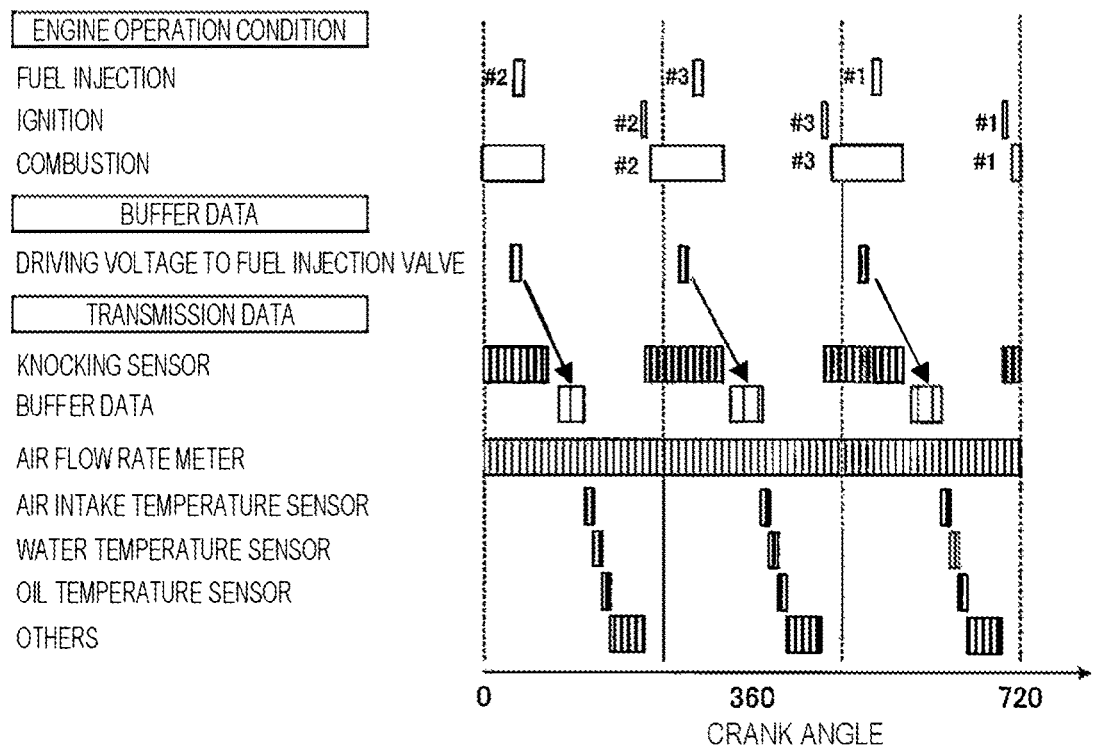
FIG. 8 depicts engine operation conditions and a sensor data transmission schedule, according to the second embodiment of the present invention.

FIG. 8 depicts engine operation conditions and a sensor data transmission schedule.

First, in FIG. 8, a fuel is injected by the fuel injection valve 7. At this time, to detect variations in timing of opening and closing of the fuel injection valve 7, a drive voltage and a drive current of the fuel injection valve 7 are converted by the A/D converter into digital values, which are stored in the buffer memory 23.

This data stored in the buffer memory 23 is data obtained at a point of time of the fuel injection valve 7 being driven, and data obtained in a different period is not stored in the buffer memory 23. In other words, sensor data is buffered (stored) only in the period during which sensor data needed for control is obtained. This allows a reduction in a storage capacity the buffer needs.

Subsequently, a fuel-air mixture is ignited by the ignition plug 9 to start combustion. At this time, to detect abnormal combustion, sensor data obtained by the knocking sensor 10 is transmitted to the control unit 18 via the serial communication line 17 This sensor data from the knocking sensor 10 is transmitted in the period of combustion cycle, and is not transmitted in other periods, such as the air intake cycle in which knocking does not occur.

Because the sensor data is serially transmitted through the serial communication line 17 only in the period during which data needed for control is obtained, transmitting data not needed for control is avoided. This reduces the volume of sensor data transmitted through serial communication.

After the sensor data from the knocking sensor 10 is serially transmitted, the drive voltage and the drive current of the fuel injection valve 7, the drive voltage and drive current being stored in the buffer memory 23, are transmitted.

In this manner, by providing the buffer memory 23, timing of serial transmission of different pieces of data can be shifted from each other.

Sensor data from the air flow rate meter 6 needs to be constantly obtained without depending on the combustion cycles of the engine 1 because sensor data that follows air intake pulsations is needed constantly. This sensor data, therefore, is constantly transmitted through the serial communication line 17 without depending on a crank angle indicating an operation condition of the engine 1.

Data from the air intake temperature sensor 19, the water temperature sensor 20, and the oil temperature sensor 21 are data independent of the combustion cycles of the engine 1. Measurements by these temperature sensors (the air intake temperature sensor 19, the water temperature sensor 20, and the oil temperature sensor 21) gradually change in several seconds to several 10 seconds, depending on the temperature of the engine 1. Sensor data from the temperature sensors thus change at low speed.

It is therefore OK to transmit such sensor data changing at low speed in an idle time in the operation cycles of the engine 1, in which idle time fewer sensor data are transmitted.

In other words, such sensor data is transmitted in a period that does not overlap periods in which a drive voltage and a drive current of the fuel injection valve 7 and sensor data from the knocking sensor 10 are transmitted. In this period, other sensor data that change at low speed are transmitted as well.

The second embodiment offers the same effects as the first embodiment offers, and additionally offers the following effects as well.

In the second embodiment, sensor data is transmitted only in the period in which the data is needed for control, instead of all sensor data being transmitted constantly, and sensor data changing at low speed is transmitted in a period in which a communication volume is relatively small. In addition, sensor data is temporarily stored in the buffer memory 23, and can be transmitted at timing shifted within a range in which the timing shift does not cause any control-related problem.

In the second embodiment, the drive voltage and current data of the fuel injection valve 7 are temporarily stored in the buffer memory 23, and are serially transmitted at timing shifted from timing of transmission of sensor data from the knocking sensor 10.

When sensor data are transmitted through serial communication, therefore, separate pieces of sensor data are transmitted in a distributive manner, in which case a maximum transmission rate can be lowered. An example of sensor data that are transmitted using the buffer memory 23 is signals that need to be acquired in a short period at a high transmission rate. Transmitting such data using the buffer memory 23 offers an effect of reducing a peak value of a communication volume.

In addition, it is possible to store data acquired at a high transmission rate in the buffer memory 23 and then serially transmit the data at a low transmission rate. This offers an effect of further reducing the peak value of the communication volume.

Third Embodiment

A third embodiment of the present invention will hereinafter be described.

In the third embodiment, a configuration in which the present invention is applied to the control system for the engine 1 will be described. In the third embodiment, the configuration in which the present invention is applied to the engine control system, as is in the first and second embodiments, will be described, with focus being placed on aspects of the third embodiment that are different from the first and second embodiments.

Figures 9, 10:
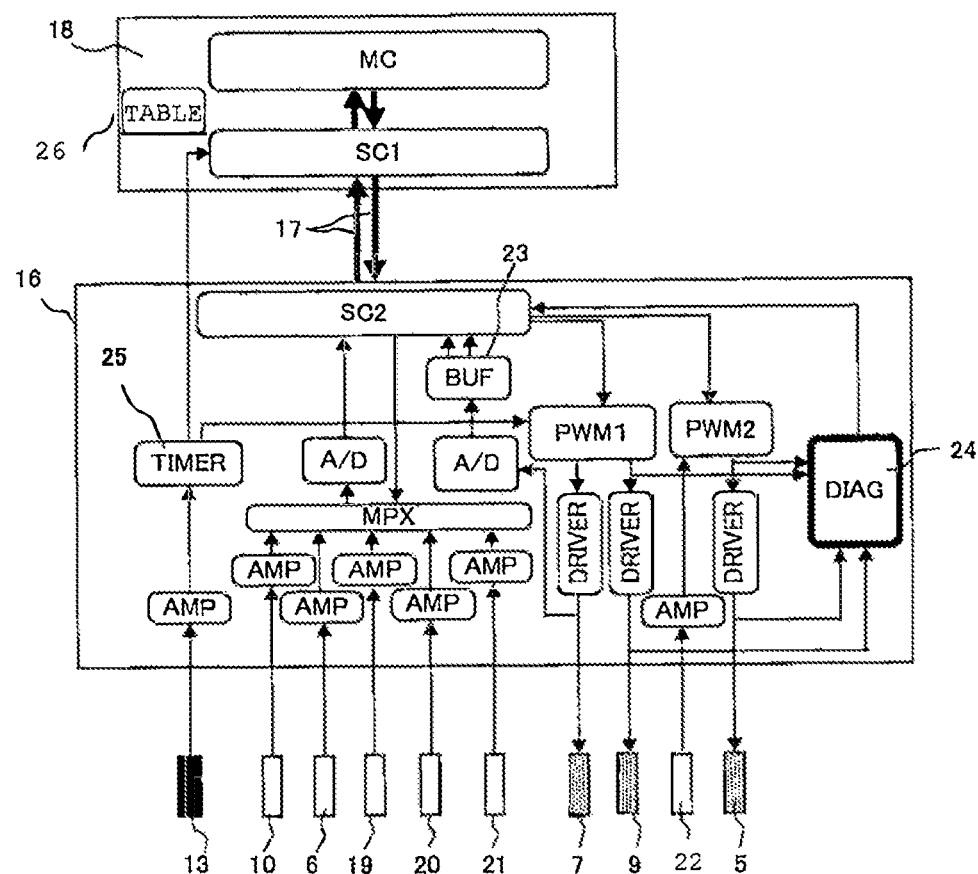
FIG. 9 depicts a configuration of a hub unit and a control unit according to a third embodiment of the present invention.
FIG. 10 depicts a data frame configuration in serial communication according to the third embodiment of the present invention.

FIG. 9 depicts a configuration of the hub unit 16 and the control unit 18 according to the third embodiment. The third embodiment is different from the first and second embodiments in that a diagnosis unit 24 is included in the hub unit 16. Although the buffer memory 23 is shown in FIG. 9, the buffer memory 23 may be omitted.

To diagnose a failure of each of the drivers that drive the ignition plug 9 and the throttle valve 5, the diagnosis unit 24 compares an input value and an output value of the driver to determine whether the driver is in a normal state or in an abnormal state. When determining that the driver is in an abnormal state, the diagnosis unit 24 transmits a signal indicating the occurrence of abnormality to the second serial communication unit SC2. When receiving the signal indicating the occurrence of abnormality from the diagnosis unit 24, the second serial communication unit SC2 transmits an abnormality signal to the arithmetic unit MC of the control unit 18, via the serial communication line 17 and the first serial communication unit SC1.

FIG. 10 depicts a data frame configuration in serial communication according to the third embodiment. This data frame configuration is difference from the data frame configuration of the first and second embodiments in that the reception frame to the master, the reception frame being transmitted from the second serial communication unit SC2 serving as the slave to the first serial communication unit SC1 serving as the master, includes a 8-bit diagnostic code DIAG indicating diagnostic information. A bit pattern indicating an abnormal part received from the diagnosis unit 24 is added to the diagnostic code DIAG. The resulting reception frame thus informs the control unit 18 of abnormality. To indicate a failure by a bit pattern difference, a bit pattern representing a normal state and a bit pattern representing an abnormal state are determined in advance.

The third embodiment offers the same effects as the first and second embodiments offer, and additionally offers the following effects as well.

According to the third embodiment, diagnosis of circuit components in the hub unit 16 can be executed in the hub unit 16. Transmitting data for failure diagnosis to the control unit 18 is, therefore, unnecessary. As a result, the volume of data in serial communication can be reduced. In a case where a signal indicating the occurrence of abnormality is transmitted to the control unit 18 via the serial communication line 17 and then a fail-safe signal is transmitted to actuator-type components via the serial communication line 17, a process of determining abnormality and then executing a fail-safe operation takes much time. In the case of the diagnosis unit 24 being included in the hub unit 16, as in the third embodiment, however, the diagnosis unit 24 can immediately execute a fail-safe operation, such as stopping a failed component, which improves safety.

The example in which the diagnosis unit 24 diagnoses failures of the drivers that drive the ignition plug 9 and the throttle valve 5 has been described. Another configuration may also be possible, in which the diagnosis unit 24 diagnoses failures of other components making up the hub unit 16 (failure of the hub unit 16), such as the amplifier AMP, the multiplexer MPX, the A\D converter A/D, the pulse generators PWM1 and PWM2, and the timer 25, and transmits (communicates) diagnosis results to the arithmetic unit MC via the first serial communication unit SC2 and the first serial communication unit SC1.

Fourth Embodiment

A fourth embodiment of the present invention will then be described.

In the fourth embodiment, the example in which the present invention is applied to the engine control system, as is in the first and second embodiments, will be described, with focus being placed on aspects of the fourth embodiment that are different from the first and second embodiments.

Figure 11:
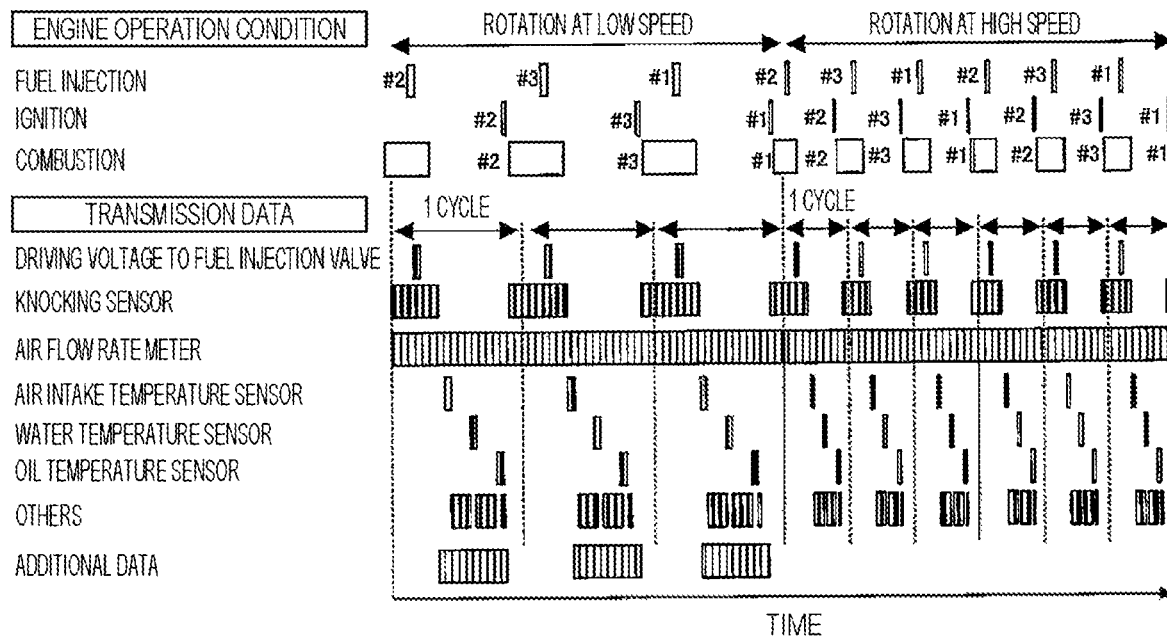
FIG. 11 is a diagram showing sensor data along a time axis, the sensor data being transmitted through serial communication to which a fourth embodiment of the present invention is applied.

FIG. 11 is a diagram showing sensor data along a time axis, the sensor data being transmitted through serial communication to which the fourth embodiment is applied. As shown in FIG. 11, a time required for executing one cycle of the scheduling table 26 differs between a case where the engine 1 operates at a low rotating speed and a case where the engine 1 operates at a high rotating speed.

In addition, in a low rotating speed range, additional detection data (additional sensor data) are present, and therefore types of sensor data to be transmitted increases, as indicated in FIG. 11. Specifically, the scheduling table 26 is provided as the scheduling table in which types of detection data partially differ between the case where the engine 1, which is the power generator, operates at a low rotating speed and the case where the engine 1 operates at a high rotating speed, and the number of types of detection data in the case where the engine 1 operates at a low rotating speed is larger than the same in the case where the engine 1 operates at a high rotating speed.

In the fourth embodiment, the number of types of sensor data to be transmitted through serial communication in the case where the engine 1 operates at a low rotating speed is larger than the same in the case where the engine 1 operates at a high rotating speed.

When the engine 1 rotates at a high speed, the rotating speed of the crank increases, and consequently the volume of sensor data transmitted via the serial communication line 17 per unit time increases. Conversely, when the engine 1 rotates at a low speed, the volume of sensor data transmitted per unit time decreases. As a result, in the state of the engine's rotating at a row speed, a margin for transmitting extra data is created in transmission of data through serial communication. Other types of sensor data, therefore, can be transmitted, in which case the transmission efficiency of serial communication is high and is effectively utilized.

The fourth embodiment offers the same effects as the first embodiment offers, and additionally offers the effects described above.

Detection data added to the low rotating speed range includes, for example, service life data on an actuator or the like.

Fifth Embodiment

A fifth embodiment of the present invention will then be described.

In the fifth embodiment, the configuration in which the present invention is applied to the engine control system, as is in the first and second embodiments, will be described, with focus being placed on aspects of the fifth embodiment that are different from the first and second embodiments.

Figure 12:
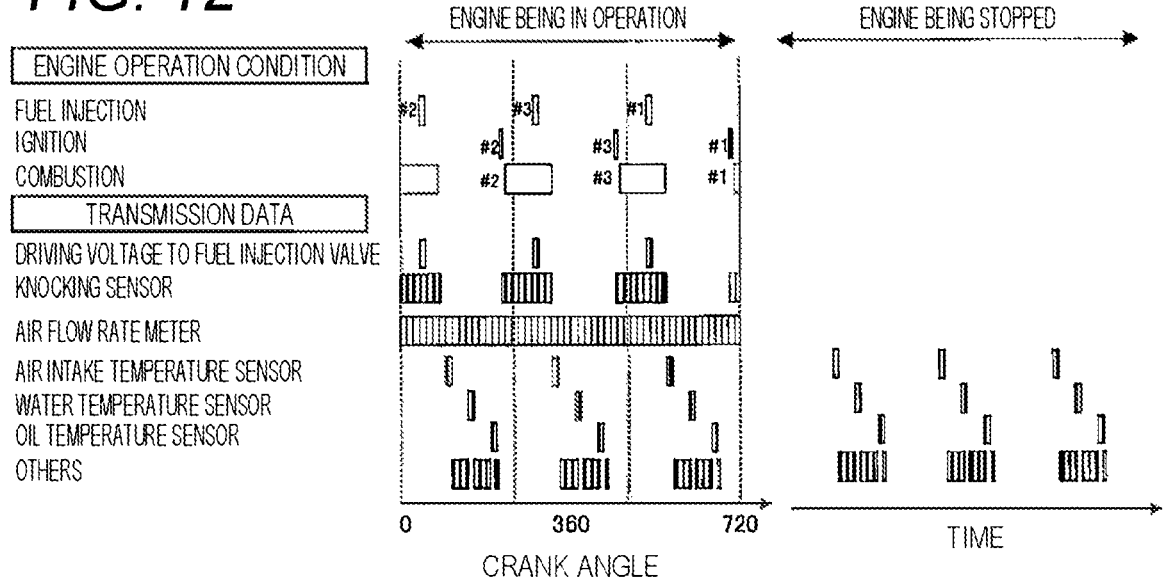
FIG. 12 depicts sensor data transmitted through serial communication to which a fifth embodiment of the present invention is applied.

FIG. 12 depicts sensor data transmitted through serial communication to which the fifth embodiment is applied. As shown in FIG. 12, the fifth embodiment includes the scheduling table 26 for executing different patterns of communication respectively in a case where the engine 1 is operating and in a case where the engine 1 is stopped.

When the engine 1 is operating, the scheduling table 26 is followed in data transmission, the scheduling table 26 determining the order of transmission of sensor data according to a crank angle. When the engine 1 is stopped, on the other hand, data transmission is scheduled by the arithmetic unit MC included in the control unit 18 or a timer included in the first serial communication unit SC1.

In other words, when the engine 1 is operating, sensor data are transmitted according to a schedule based on a crank angle, and when the engine 1 is stopped, sensor data are transmitted according to a schedule based on time sequence.

Timing of switching between the above two types of scheduling set in the scheduling table 26 is determined in the following manner: a given threshold for the rotating speed of the engine 1 is set, and scheduling is switched between a case where the rotating speed is lower than the threshold and a case where the rotating speed is higher than the threshold. The rotating speed can be calculated from a crank angle.

Even when the engine 1 is stopped and the crank angle does not change any more, therefore, necessary data can be transmitted and received via the serial communication line 17.

The fifth embodiment offers the same effects as the first embodiment offers, and additionally offers the effects described above.

In the fifth embodiment, the example in which the scheduling table 26 for executing different patterns of communication respectively in the case where the engine 1 is operating and in the case where the engine 1 is stopped has been described. The fifth embodiment, however, may include the scheduling table 26 that sets communication executed in a case where the engine 1 shifts from a stopped state (idling) to an operation state (start) or the scheduling table 26 for executing different patterns of communication according to operation conditions of the engine 1, such as its shifting from the operation state to the stopped state.

Sixth Embodiment

A sixth embodiment of the present invention will then be described.

The sixth embodiment is an example in which the present invention is applied to a controller for an electric motor, which is a power generator different from the engine 1.

Figure 13:
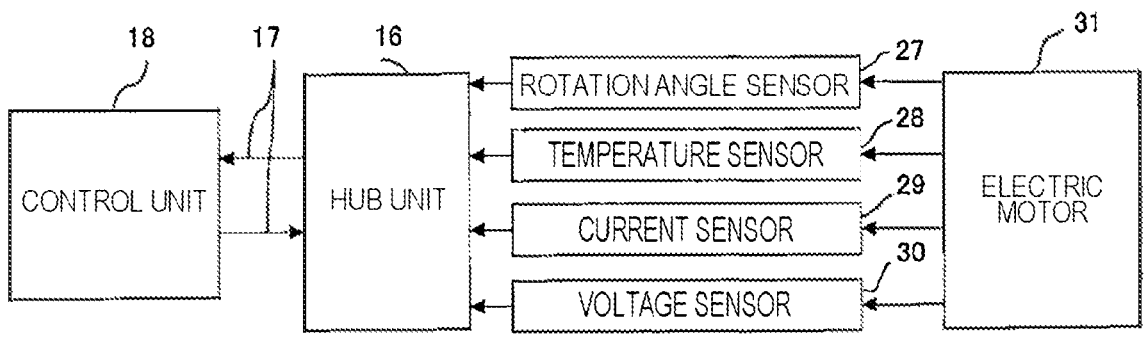
FIG. 13 is a schematic configuration diagram of a sixth embodiment of the present invention.

FIG. 13 is a schematic configuration diagram of the sixth embodiment.

In FIG. 13, the power generator is an electric motor 31, and the scheduling table 26 included in the control unit 18 or the hub unit 16 determines the order of transmission (communication) of sensor signals, based on a rotation angle of the electric motor 31.

A resolver can be used as a rotation angle sensor 27 that detects the rotation angle of the electric motor 31. Sensor data transmitted to the control unit 18 via the hub unit 16 and the serial communication line 17 includes a temperature sensor signal detected by a temperature sensor 28, a current sensor signal detected by a current sensor 29, and a voltage detection signal detected by a voltage sensor 30.

The internal configuration of the control unit 18 is the same as that of the first embodiment, and is therefore not described in detail. The internal configuration of the hub unit 16 includes the second serial communication unit SC2, the amplifier AMP, the multiplexer MPX, the driver DRIVER, the pulse generator PWM1, the pulse generator PWM2, and the timer 25, as the internal configuration of the hub unit 16 of the first embodiment does.

In the sixth embodiment, to which the same technical concept of the first embodiment applies, sensor data is transmitted only in the period in which the data is needed for control, instead of all sensor data being transmitted constantly, based on a rotation angle of the electric motor 31, the rotation angle indicating an operation condition of the electric motor 31. In addition, sensor data can be efficiently transmitted by serially transmitting the sensor data, based on the scheduling table 26 which determines the order of data transmission in advance such that sensor data changing at low speed is transmitted in a period in which a communication volume is relatively small.

Thus, according to the sixth embodiment, a vehicle controller that in serial transmission executed at a limited transmission rate, can efficiently transmit a large volume of sensor data and stably execute data processing and control can be provided.

Seventh Embodiment

A seventh embodiment of the present invention will then be described.

The seventh embodiment is an example in which the present invention is applied to an autonomous driving device of a vehicle.

Figure 14:
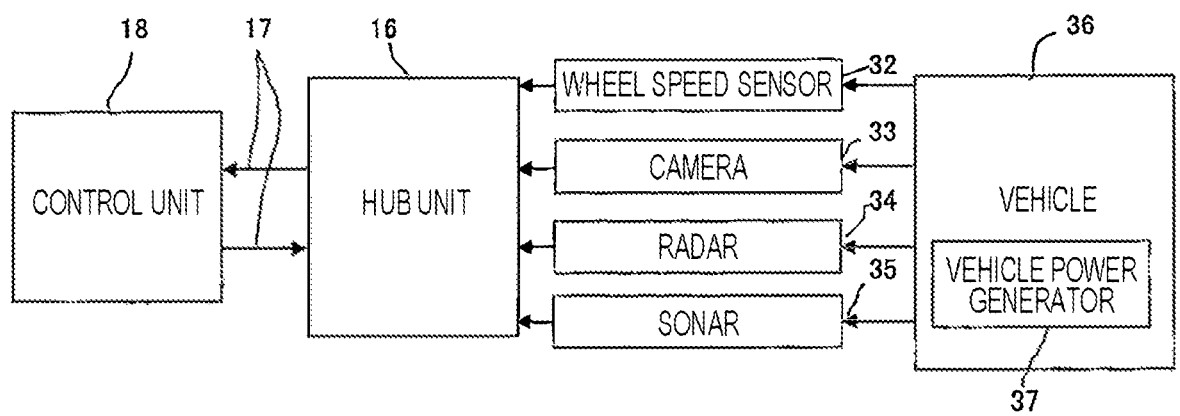
FIG. 14 is a schematic configuration diagram of a seventh embodiment of the present invention.

FIG. 14 is a schematic configuration diagram of the seventh embodiment. An internal combustion engine or an electric motor of the vehicle 36 and a brake and a steering (vehicle power generator 37) of the same are power generators. The scheduling table 26 disposed in the control unit 18 or the hub unit 17 determines the order of transmission of sensor signals, based on a speed of the vehicle 36.

A wheel speed sensor 32 can be used as a sensor that detects a speed of wheels of the vehicle 36. Sensor data transmitted from the hub unit 16 to the control unit 18 via the serial communication line 17 include imaging data obtained by a camera 33, distance data indicating a distance to an object, the distance data being obtained by a radar 34, and distance data indicating a distance to an object, the distance data being obtained by a sonar 35.

The internal configuration of the control unit 18 is the same as that of the first embodiment, and is therefore not described in detail. The internal configuration of the hub unit 16 includes the second serial communication unit SC2, the amplifier AMP, the multiplexer MPX, the driver DRIVER, the pulse generator PWM1, the pulse generator PWM2, and the timer 25, as the internal configuration of the hub unit 16 of the first embodiment does.

In the seventh embodiment, to which the same technical concept of the first embodiment applies, sensor data is transmitted only in the period in which the data is needed for controlling the vehicle power generator 37 of the vehicle 36, instead of all sensor data being transmitted constantly, based on a vehicle speed of the vehicle 36. In addition, sensor data can be efficiently transmitted by serially transmitting the sensor data, based on the scheduling table 26 which determines the order of data transmission in advance such that sensor data changing at low speed is transmitted in a period in which a communication volume is relatively small.

Thus, according to the seventh embodiment, a vehicle controller (a vehicle controller incorporated in a vehicle) that in serial transmission executed at a limited transmission rate, can efficiently transmit a large volume of sensor data and stably execute data processing and control can be provided.

It should be noted that the internal combustion engine of the vehicle 36 or the electric motor 31 is defined as the power generator according to the seventh embodiment.

REFERENCE SIGNS LIST 1 engine
2 combustion chamber
3 air intake passage
4 air cleaner
5 throttle valve
6 air flow rate meter
7 fuel injection valve
8 air intake valve
9 ignition plug
10 knocking sensor
11 piston
12 crankshaft
13 crank angle sensor
14 exhaust valve
15 catalyst
16 hub unit
17 serial communication line
18 control unit
19 air intake temperature sensor
20 water temperature sensor
21 oil temperature sensor
22 throttle position sensor
23 buffer memory
24 diagnosis unit
25 timer
26 scheduling table
27 rotation angle sensor
28 temperature sensor
29 current sensor
30 voltage sensor
31 electric motor
32 wheel speed sensor
33 camera
34 radar
35 sonar
36 vehicle
37 vehicle power generator
AMP amplifier
MC arithmetic unit
SC1 first serial communication unit
SC2 second serial communication unit

The invention claimed is:

1. A vehicle controller comprising:
a plurality of detectors that detect a plurality of operation conditions of a power generator;
a control unit that controls the power generator, based on pieces of detection data outputted from the plurality of detectors;
a data collecting unit that collects the pieces of detection data together;
a serial communication line for serially transmitting the pieces of detection data from the data collecting unit to the control unit; and
a transmission order setting unit that sets a transmission order of the pieces of detection data in advance, wherein
data that changes at a speed that is lower than a given speed value is transmitted in a period in which a communication volume is lower than a given communication volume value, and
the transmission order is an order in which the pieces of detection data are serially transmitted from the data collecting unit to the control unit.

2. The vehicle controller according to claim 1, wherein a transmission order of the pieces of detection data, the transmission order being set in advance by the transmission order setting unit, is set based on an operation condition of the power generator.

3. The vehicle controller according to claim 2, wherein the data collecting unit is a hub unit, and the transmission order setting unit is a scheduling table.

4. The vehicle controller according to claim 3, wherein
the hub unit includes a buffer memory that stores the detection data obtained by one of the plurality of detectors in a given period, and
the detection data stored in the buffer memory are serially transmitted from the hub unit to the control unit in a transmission order set by the scheduling table.

5. The vehicle controller according to claim 3, wherein the hub unit includes a diagnosis unit that diagnoses a failure of the hub unit and that transmits a diagnosis result from the hub unit to the control unit through a serial communication line.

6. The vehicle controller according to claim 3, wherein in the scheduling table, types of the detection data differ partially between a case where the power generator operates at a low rotating speed and a case where the power generator operates at a high rotating speed.

7. The vehicle controller according to claim 6, wherein in the scheduling table, number of types of the detection data in a case where the power generator operates at the low rotating speed is larger than number of types of the detection data in a case where the power generator operates at the high rotation speed.

8. The vehicle controller according to claim 3, wherein in the scheduling table, types of the detection data differ partially between a case where the power generator is operating and a case where the power generator is stopped.

9. The vehicle controller according to claim 3, wherein
the power generator is an internal combustion engine, and one of the pieces of detection data is a crank angle of the internal combustion engine, and
the scheduling table sets a transmission order of the pieces of detection data to be transmitted, based on the crank angle.

10. The vehicle controller according to claim 3, wherein
the power generator is an electric motor, and one of the pieces of detection data is a rotation angle of the electric motor, and
the scheduling table sets a transmission order of the pieces of detection data to be transmitted, based on the rotation angle.

11. The vehicle controller according to claim 3, wherein
the power generator is an internal combustion engine or an electric motor, and
the scheduling table sets a transmission order of the pieces of detection data to be transmitted, based on a speed of a vehicle in which the vehicle controller is incorporated.

* * * * *